Oct. 10, 1933.  J. H. McCOLLOUGH  1,929,435
VARIABLE PITCH AND REVERSIBLE PROPELLER
Filed Feb. 15, 1930  3 Sheets-Sheet 1
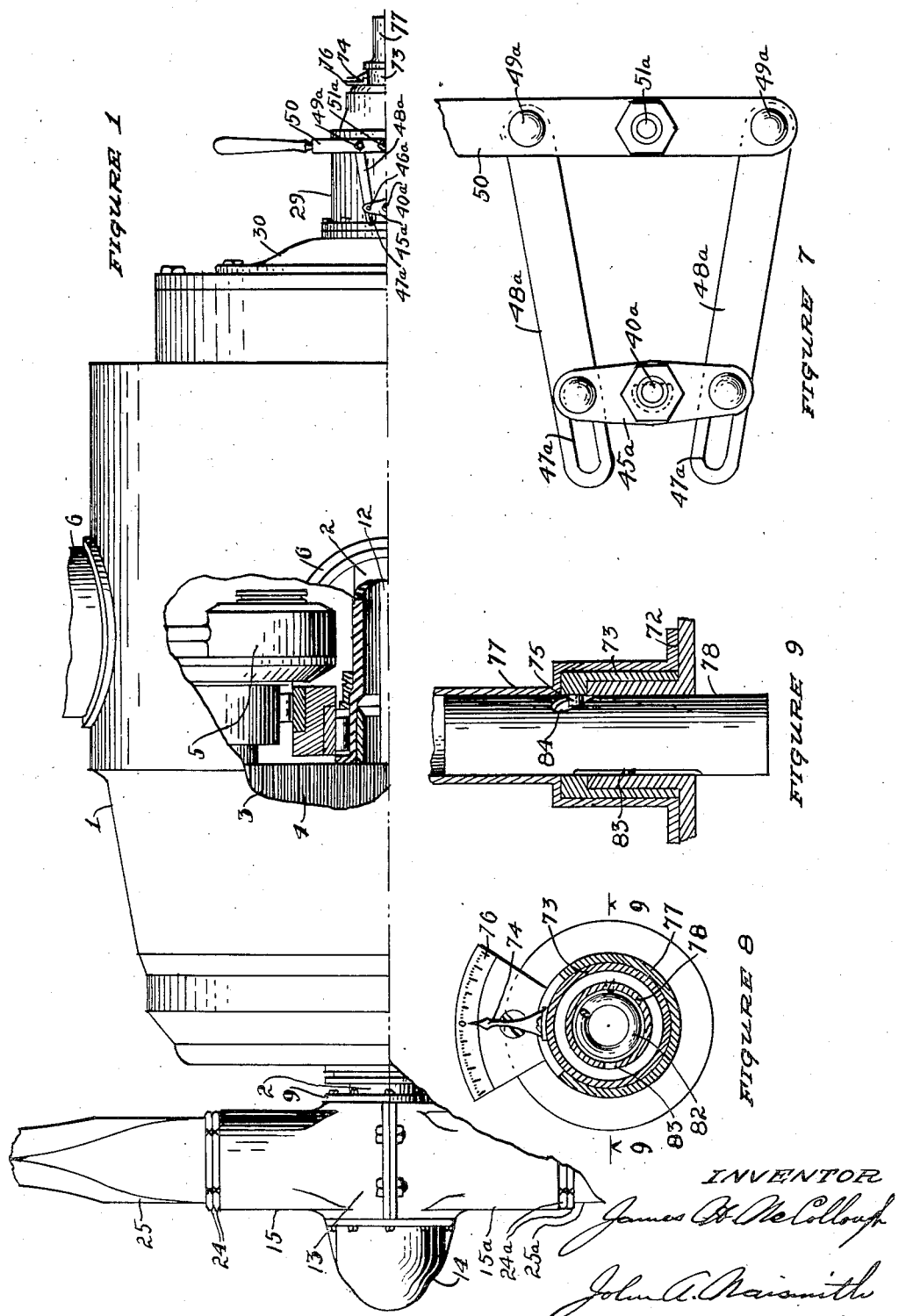

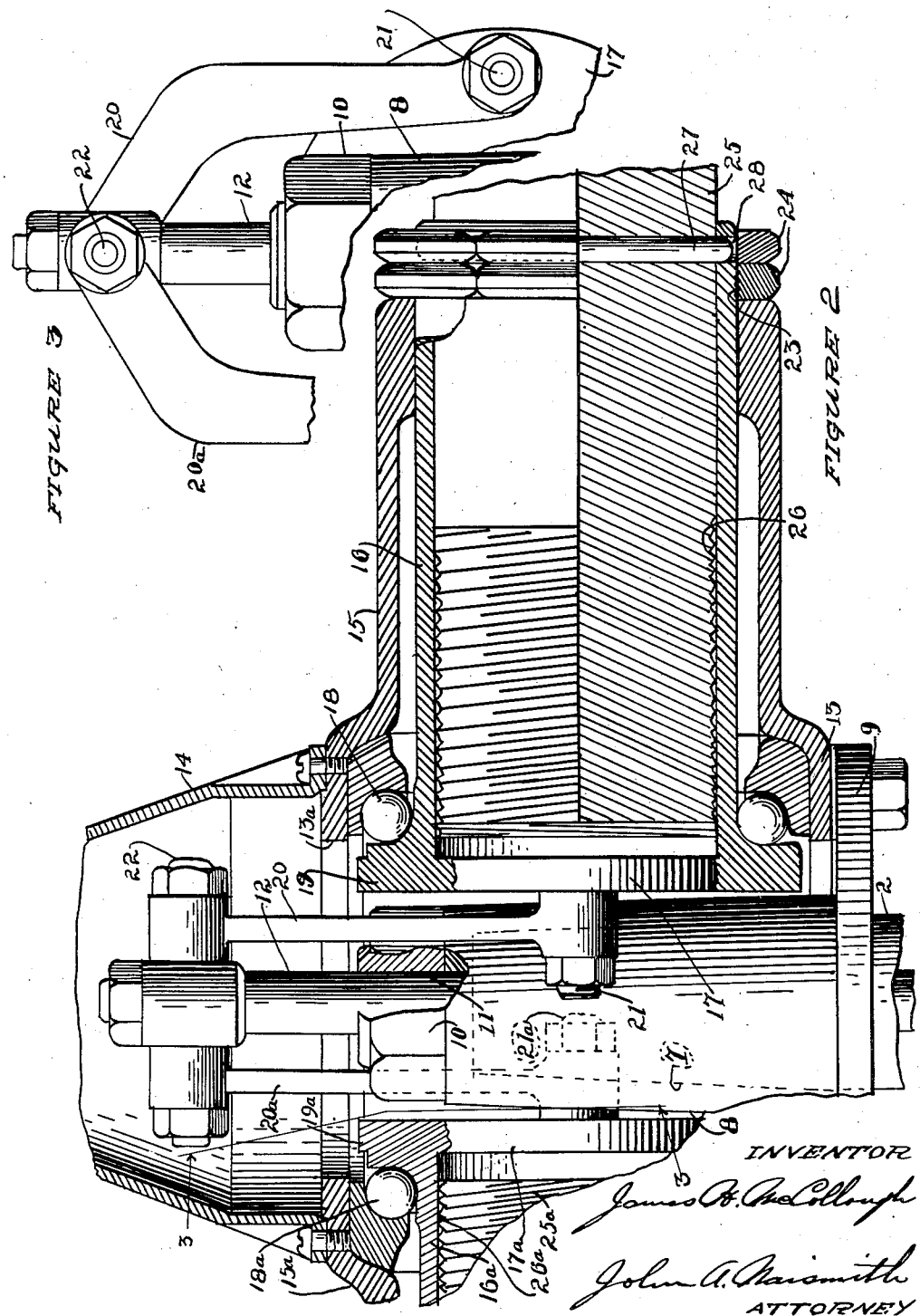

Oct. 10, 1933. J. H. McCOLLOUGH 1,929,435
VARIABLE PITCH AND REVERSIBLE PROPELLER
Filed Feb. 15, 1930 3 Sheets-Sheet 3
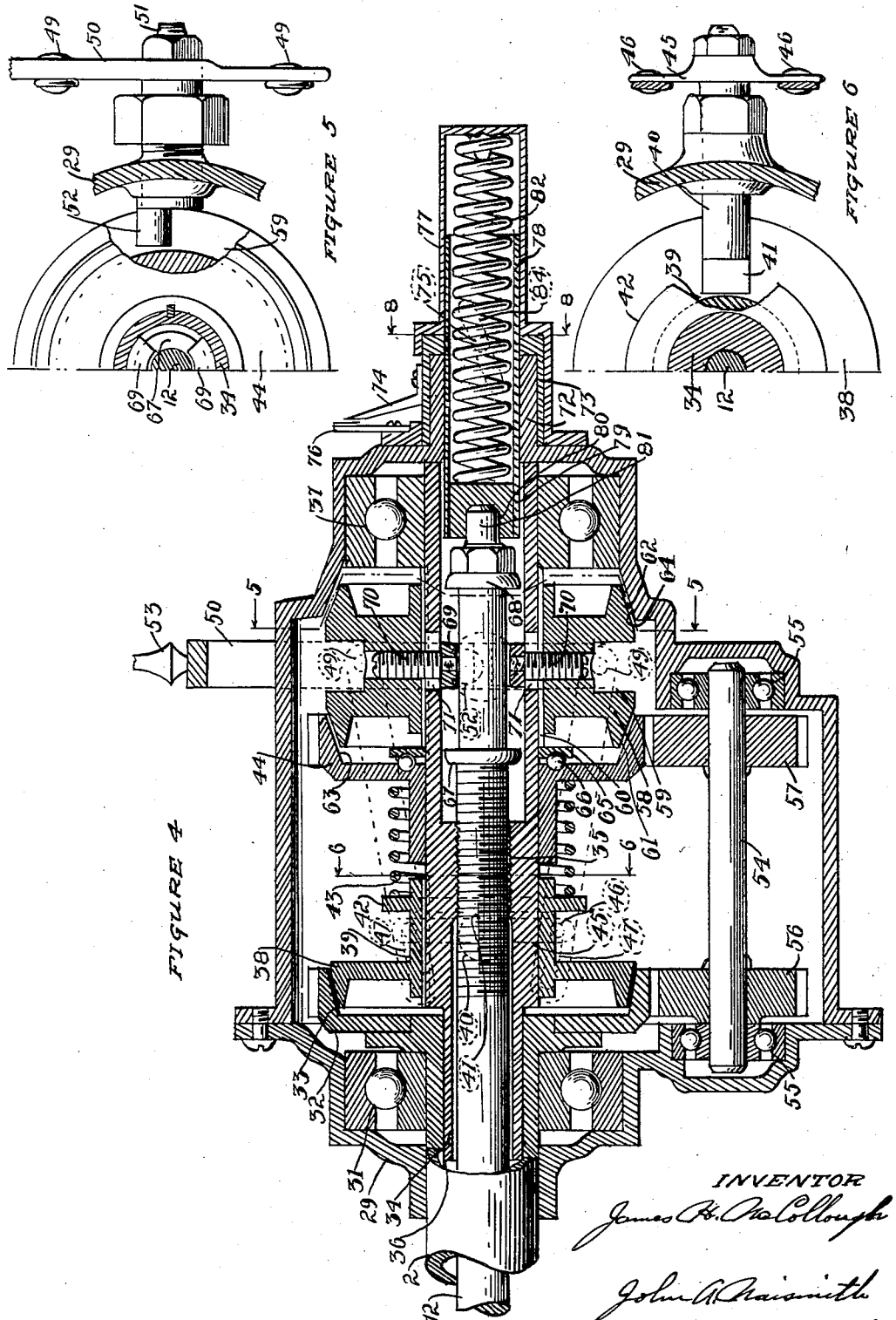

Patented Oct. 10, 1933

1,929,435

UNITED STATES PATENT OFFICE 1,929,435

VARIABLE PITCH AND REVERSIBLE PROPELLER

James H. McCollough, San Jose, Calif.

Application February 15, 1930. Serial No. 428,675

20 Claims. (Cl. 170—163)

This invention relates particularly to adjustable aeroplane propellers and means for effecting adjustment of the blades about their longitudinal axes.

It is one object of the invention to provide means whereby the propeller blades may be simultaneously, equally, and oppositely adjusted about their longitudinal axes at the will of the operator. It is another object to provide efficient means for preventing the blades from becoming locked in either the extreme forward or reverse positions. It is still another object to provide a means whereby the operator may tell at a glance the exact angular position of the blades relative to their plane of rotation. A further object of the invention is to provide a simple and efficient engine actuated mechanism for effecting the adjustment of the propeller blades. A still further object is to provide means for quickly reversing the blades to serve as a brake. Finally, it is an object of the invention to provide a simple, strong, durable means whereby the operator may at will utilize the power of the aeroplane engine to effect any desired degree of adjustment of the propeller blades, forward or reverse, through the manipulation of a simple control conveniently placed.

In the drawings:

Figure 1 is a side elevation of a portion of an engine equipped with my improved propeller mechanism, parts broken away.

Figure 2 is a longitudinal section through the propeller hub, parts broken away.

Figure 3 is a view on line 3—3 of Figure 2, parts broken away.

Figure 4 is a longitudinal section through the propeller control mechanism.

Figure 5 is a section on line 5—5 of Figure 4.

Figure 6 is a section on line 6—6 of Figure 4.

Figure 7 is a side elevation of the clutch shifting means.

Figure 8 is a section on line 8—8 of Figure 4.

Figure 9 is a section on line 9—9 of Figure 8.

As herein disclosed the invention comprises an internal combustion engine 1 having a straight hollow propeller shaft 2 which may be operated in any suitable manner as by means of meshing gears 3—4 actuated by crank 5 with the usual connections to a cylinder shown in part at 6. The cylinders may be radially disposed about the engine, or in any manner desired, the feature of importance being the provision of a straight, hollow, drive shaft.

Upon the tapered end 7 of shaft 2 is mounted a collar 8 provided with a flange 9 on its inner end and secured in place by a nut 10 engaging the threaded end of the shaft 7, the said nut forming a bearing at 11 for the propeller adjusting rod 12.

A housing 13 is mounted on the flange 9 and is provided with an opening 13a in its forward end closed by a cap 14, and a pair of oppositely directed axially aligned hubs as 15—15a.

The parts mounted on hub 15a are identical with those on hub 15 and are indicated, where shown, by similar numerals followed by the letter "a".

In hub 15 is rotatably mounted an internally threaded ferrule 16 having a closed inner end 17 provided with an outwardly extending flange 19 journaled on ball bearings 18 seated in hub 15. At 20 is shown a link having one end mounted upon a pin 21 on ferrule 16 and the other end mounted upon a pin 22 on the end of rod 12. As herein shown the parts are so proportioned and arranged that the pins 21—21a are equally spaced on opposite sides of rod 12 and lie in a plane bisecting members 16—16a at right angles to rod 12. By means of this construction a longitudinal movement of the rod 12 in either direction will rotate ferrules 16—16a equally in opposite directions. The outer end of member 16 is threaded as at 23 to receive nuts 24. The propeller blade 25 is secured in position by threading into the ferrule 16 at 26 after which a pin 27 is passed therethrough and through holes 28 in the end of ferrule 16, the said pin being held in position by the nuts 24.

The rod 12 must, of course, rotate as a unit with shaft 2 and at the same time be slidably adjustable in order to effect the desired adjustment of the propeller blades through the medium of the mechanism above set forth. This is accomplished in the following manner.

I provide a housing 29 and mount the same upon the engine 1 in any suitable manner as at 30 and in such a position that the end of shaft 2 remote from the propeller passes through one end thereof, the shaft being supported on ball bearings 31 in housing 29. This end of the shaft has a gear 32 mounted thereon, the gear being formed with an inner conical surface 33 adapted to form a part of a friction clutch.

At 34 I show a sleeve encompassing the rod 12 and having threaded engagement therewith throughout a portion only of its length as at 35, one end of the sleeve revolubly engaging the adjacent end of the shaft as at 36, and the other end being mounted in bearing 37 in housing 29.

Keyed to sleeve 34 to rotate therewith is a friction clutch member 38 slidable into and out of engagement with surface 33 of gear 32. The member 38 is provided with a collar 39, and revolubly mounted in each side of the housing 29 is a rock shaft 40, the inner end of the shaft entering the collar 39 and having a flat side as 41 formed thereon whereby rocking the shaft in either direction from normal will cause it to engage the flange 42 and move the member 38 out of engagement with gear 32, the clutch members 38—32 being normally held in engagement by a spring 43 inserted between the flange 42 and a gear 44 also mounted on the sleeve 34 and rotatable with respect thereto.

The rock shaft 40 is operated by means of a cross arm 45 mounted on the outer end thereof and fitted with pins 46 engaging slots 47 in links 48, these links being pivotally mounted as at 49 on a lever 50. Mounted on lever 50 equally spaced from pivots 49 is a rock shaft 51 journaled in housing 29 and terminating in an eccentrically disposed finger 52 for the purpose hereinafter described. The lever 50 normally assumes an upright position and is fitted with a handle 53. The result of this construction is that when the lever is moved in either direction the rock shaft 40 is instantly actuated to disengage the clutch member 38 from gear 32, thereby permitting independent rotation of shaft 2 and sleeve 34.

To effect the desired sliding movement of rod 12 relative to shaft 2 when the clutch is disengaged I provide a stub shaft 54 mounted in bearings 55 in housing 29, and on this shaft are mounted gears 56 and 57 meshing with gears 32 and 44 respectively. The pairs of meshing gears 56—32 and 57—44 have slightly different pitch diameters so that the gear 44 is rotated a little faster than the gear 32.

As 58 is shown a friction clutch member having an annular groove 59 formed therein to receive the eccentrically disposed finger 52 whereby it may be shifted backwardly or forwardly on sleeve 34 to which it is keyed as at 60. This member is provided with oppositely disposed conical friction surfaces 61 and 62, the surface 61 being engageable with a surface 63 on the inner side of gear 44, and the surface 62 being engageable with a surface 64 on the inner side of the housing 29.

The gear 44 is held in place against the pressure of spring 43 by a collar 65 and ball bearing 66 on sleeve 34, and of course there is a sliding engagement between the spring 43 and the gear 44 to permit rotation of the gear.

It may now be seen that with the several parts properly assembled and adjusted, when the lever 50 is in the position shown the clutch 38—32 is operative and the shaft 2 and rod 12 rotate as a unit and the propeller blades lie in the plane of rotation, the gear 44 rotating slowly on sleeve 34. If the lever is thrown forwardly it first disengages the clutch 38—32 and then immediately engages clutch 58—44 thereby causing the gear 44 to rotate as a unit with sleeve 34, but since the gear 44 is driven by shaft 2 and at a slightly higher rate of speed than the shaft 2 the sleeve 34 is likewise caused to rotate a little faster than the shaft 2 and rod 12. Since the sleeve 34 has no longitudinal movement and is in threaded engagement with the rod 12 this difference in speed of rotation operates to slide the rod 12 in one direction, thereby actuating the links 20—20a to turn the propeller blades into angular relation to their plane of rotation as hereinbefore described. Any desired angle of the blades may be secured and maintained by this means because when the lever 50 is returned to its normal position the clutch 58—44 is released and the clutch 38—32 engaged and the sleeve 34, shaft 2, and rod 12, again all rotate at the same speed.

The reversal of the angular positions of the blades is accomplished in substantially the same manner. By throwing the lever 50 backwardly the clutch 38—32 is first disengaged and then the clutch 58—29 is rendered operative, but since the part 29 is the fixed housing, the member 58 and sleeve 34 are held against rotation and the rotating rod 12 advances itself relative thereto through the medium of the threaded enegagement 35.

In a mechanism of this kind it is necessary that some means be provided to prevent the clutch member 58 from being held in an extreme advanced or retracted position for an undue length of time. Such a condition might arise under various circumstances such as, for instance, if the operator throws the lever over and becomes rigid through a sudden attack of fear.

The automatic release of the clutch member 58 is effected by mounting spaced stops as 67 and 68 on rod 12, and mounting a split collar 69 in the sleeve 34 and between the stops. Screws 70 are inserted through the member 58 and into the said collar, openings 71 being formed in the sleeve to permit passage of the screws. By this means the clutch will be automatically disengaged whenever the rod 12 moves far enough for either stop to enegage the collar 69 and impart an axial movement thereto and to the member 58 on which it is mounted.

In order that the operator may be able to tell at a glanace just what angle the blades have assumed the following mechanism is provided.

On the end of the housing 29 is formed a bearing portion 72, and rotatably mounted on portion 72 is an annulus 73 carrying a pointer 74 and having a flange formed thereon overlying the end of portion 72 and fitted with an inwardly extending pin 75. A dial 76 is mounted on the housing 29 beneath the pointer 74 and graduated both ways from zero. A cap 77 is mounted on the housing 29 over the parts 72—73, and in the cap is slidably mounted a tube 78 closed at its forward end 79, at which point it is provided with a bearing 80 to receive the end 81 of rod 12. This tube is maintained in engagement with the rod 12 by means of a spring 82 disposed within the tube and cap, and the tube is prevented from rotating in the cap by means of an engaging pin and slot as indicated at 83. The tube is also provided with a slot 84 engaging pin 75, the slot 84 being angularly disposed relative to the direction of movement of the tube.

With the pointer indicating zero on the dial, when the propeller blades are in a neutral position any angular position that they may assume through the longitudinal adjustment of rod 12 is immediately registered on the dial because any sliding movement imparted to tube 78 will, through the medium of the engaging slot and pin 84—75, impart a rotating movement to annulus 73 upon which the pointer 74 is mounted.

It may now be seen that in this construction the power of the engine is effectively utilized to vary the pitch of the propeller blades against the air pressures acting thereon, and this power is rendered effective by merely throwing lever 50 forwardly, the change in pitch being slow enough to be always under the perfect control of the operator.

In reversing the pitch of the blades, the action is accomplished quickly because the blades move a distance with the air pressures acting thereon, and the braking of member 58 and through it sleeve 34 without diminishing the speed of rotation of rod 12 causes a quick axial displacement of the rod relative to the sleeve.

It is to be understood, of course, that while I have herein shown and described but one specific embodiment of the invention, changes in form, construction, and method of assembly and operation may be made within the scope of the appended claims.

I claim:

1. In combination, an engine having a straight, hollow, gear driven propeller shaft, angularly adjustable propeller blades mounted on one end thereof, a rod passing through said shaft and connected to the blades to adjust the same when moved longitudinally, a sleeve threaded on to the shaft to rotate therewith and means for supporting the same against longitudinal movement, a clutch inserted between the sleeve and shaft, a fixed braking element, a clutch element rotatably mounted on the sleeve but longitudinally fixed with respect thereto, speed changing driving means connecting the said clutch element and the shaft, a double clutch element mounted on the shaft and rotatably fixed with respect thereto and movable into engagement with either the fixed braking element or the clutch element, and means for successively actuating the first mentioned clutch and the double clutch element.

2. In combination, a hollow propeller shaft and driving means therefor, angularly adjustable blades mounted on one end of the shaft, and adjusting means for the blades including a longitudinally adjustable rod passing through the shaft and rotatable as a unit therewith, a sleeve threaded on to the rod at the end of the shaft remote from the blades, and clutch controlled driving means means inserted between the shaft and sleeve whereby the speed of rotation of the sleeve may be varied to effect a longitudinal movement of the rod, and means for preventing longitudinal movement of the sleeve.

3. In combination, a hollow propeller shaft and driving means therefor, angularly adjustable blades mounted on one end of the shaft, and adjusting means for the blades including a longitudinally adjustable rod passing through the shaft and rotatable as a unit therewith, and a clutch controlled screw connection between the shaft and rod whereby to adjust the rod longitudinally with respect to the shaft.

4. In combination, a hollow propeller shaft and driving means therefor, angularly adjustable blades mounted on one end of the shaft, and adjusting means for the blades including a longitudinally adjustable rod connected thereto and passing through the shaft and rotatable as a unit therewith, a sleeve having threaded engagement with the rod and supported against longitudinal movement with respect thereto, a gear mounted on the shaft remote from the blades, a clutch inserted between the gear and sleeve, a second gear revolubly mounted on the sleeve, driving connections between the gears whereby to rotate the second gear at a higher rate of speed than the first gear, a clutch inserted between the second gear and the sleeve, and means for operating the clutches successively.

5. The combination of a straight, hollow, propeller shaft and driving means therefor, adjustable blades mounted thereon for angular adjustment about their longitudinal axes, an axially movable element mounted within the shaft to rotate as a unit therewith and passing therethrough, means actuated by movement of the element for adjusting the blades, power operated means for moving the element in one direction to effect the angular adjustment of the blades against wind pressures, and means cooperating with the wind pressure to effect the quick reversal of the angular adjustment of the blades.

6. The combination of a straight, hollow, propeller shaft and driving means therefor, adjustable blades mounted thereon for angular adjustment about their longitudinal axes, an axially movable element mounted within the shaft to rotate as a unit therewith and passing therethrough, means actuated by movement of the element for adjusting the blades, means for axially moving the element to adjust the blades while the shaft is rotating, and means rendered operative by axial movement of the element for indicating the angular position of the blades.

7. The combination of a straight, hollow propeller shaft and driving means therefor, blades mounted thereon for angular adjustment about their longitudinal axes, an axially movable element mounted within the shaft to rotate as a unit therewith and passing therethrough, means actuated by the element for adjusting the blades, a gear mounted on the shaft, a sleeve mounted on the element and having threaded engagement therewith whereby rotation of one relative to the other will move the element through the sleeve, a second gear concentrically mounted relative to the element, means for driving the second gear at a fixed relative higher speed than the first gear and in the same direction, and mechanism mounted on the sleeve to rotate therewith and movable to effect a driving engagement with either gear.

8. The combination of a straight, hollow propeller shaft and driving means therefor, blades mounted thereon for angular adjustment about their longitudinal axes, an axially movable element mounted within the shaft to rotate as a unit therewith and passing therethrough, means actuated by the element for adjusting the blades, a gear mounted on the shaft, a second gear concentrically mounted relative to the element, means for driving the second gear at a fixed relative higher speed than the first gear and in the same direction, a fixed braking element, and mechanism shiftable into engagement with either of said gears or brake element and having a driving connection with the axially movable element whereby a relative rotary movement between them will effect a proportional axial displacement.

9. The combination with a propeller having angularly adjustable blades, of mechanism for adjusting said blades in either direction, said mechanism including a longitudinally adjustable and rotating element, a power actuated rotary element, a relatively fixed element, normally inoperative rotary means adapted to move the adjusting element longitudinally in either direction when one is rotated with respect to the other, and means for moving the rotary means into engagement with either the rotary element or the fixed element to render it operative to move the adjusting element.

10. The combination with a propeller having angularly adjustable blades, of mechanism for adjusting the blades, said mechanism including a longitudinally adjustable element, a relatively fixed element, normally inoperative rotary means adapted to move the adjusting element longitudinally when one is rotated with respect to the other, and means for moving the rotary means into engagement with the fixed element to render it operative to move the adjusting element.

11. The combination with a propeller having angularly adjustable blades, of mechanism for adjusting the blades, said mechanism including a longitudinally adjustable rotating element, a power actuated rotating element, normally inoperative rotary means adapted to move the adjusting element longitudinally when one is rotated with respect to the other, and means for moving the rotary means into engagement with the power actuated rotating element to render it operative to move the adjusting element.

12. In combination, a propeller shaft, angularly adjustable blades mounted thereon, and mechanism for adjusting the blades including a longitudinally adjustable and rotating element connected thereto, a disengageable rotary driving connection between the shaft and element, a shaft actuated rotary element, a relatively fixed element, normally inoperative rotary means adapted to move the adjusting element longitudinally in either direction when a rotary movement is developed between them, and means for first disengaging the driving engagement between the shaft and element and then moving the rotary means into operative engagement with either the rotary element or the fixed element whereby to impart a longitudinal movement to the adjusting element.

13. Propeller blade pitch changing mechanism of the character described, including a drive shaft, angularly adjustable blades on the shaft, blade control means, means for actuating the control means, clutch means for the shaft and the actuating means of the control means whereby to set the blades in forward or reverse position, and means for controlling the clutch means whereby to automatically and predeterminately release same when the blades have reached their extreme of either forward or reversed setting.

14. Propeller blade pitch changing mechanism of the character described, including a hollow drive shaft, angularly adjustable blades on said shaft, a blade control shaft extending through said hollow shaft and rotatable as a unit therewith, a housing located at the end of the hollow shaft remote from the blades, a sleeve threaded upon a portion of the control shaft which projects beyond the end of the hollow shaft and mounted for rotation in said housing, and clutch means within the housing whereby power may be taken from said hollow drive shaft for turning said sleeve in either direction to effect longitudinal movement of the control shaft.

15. Propeller blade pitch changing mechanism of the character described, including a hollow drive shaft, angularly adjustable blades on said shaft, a blade control shaft extending through said hollow shaft and rotatable as a unit therewith, a housing located at the end of the hollow shaft remote from the blades, a sleeve threaded upon a portion of the control shaft which projects beyond the end of the hollow shaft and mounted for rotation in said housing, clutch means within the housing whereby power may be taken from said hollow drive shaft for turning said sleeve in either direction to effect longitudinal movement of the control shaft, and means for controlling the clutch means whereby to automatically and predeterminately release same when the blades have reached their extreme of either forward or reversed setting.

16. Propeller blade pitch changing mechanism of the character described, including a drive shaft, angularly adjustable blades on said shaft, blade control means, a normally operable clutch interposed between said shaft and control means whereby to cause the shaft and control means to operate as a unit, means for simultaneously disengaging said clutch and for effecting relative longitudinal movement of the shaft and control means for varying the pitch change of the propeller blades, and power means for actuating said drive shaft.

17. Propeller blade pitch changing mechanism of the character described, including a drive shaft, angularly adjustable blades on said shaft, blade control means, a normally operable clutch interposed between said shaft and control means whereby to cause the shaft and control means to operate as a unit, means for simultaneously disengaging said clutch and for effecting relative longitudinal movement of the shaft and control means for varying the pitch change of the propeller blades, means carried by the control means to automatically and predeterminately release the last named means when the blades have reached their extreme forward or reverse position, and power means for actuating said driving shaft.

18. Propeller blade pitch changing mechanism of the character described, including a drive shaft, angularly adjustable blades on said shaft, blade control means, a normally operable clutch interposed between said shaft and control means whereby to cause the shaft and control means to operate as a unit, means for simultaneously disengaging said clutch and for effecting relative longitudinal movement of the shaft and control means for varying the pitch change of the propeller blades, means carried by the control means to automatically and predeterminately release the last named means when the blades have reached their extreme forward or reverse position, a blade pitch indicator, means connecting the control shaft and indicator, and power means for actuating said drive shaft.

19. Propeller blade pitch changing mechanism of the character described, including a drive shaft, angularly adjustable blades on said shaft, blade control means, a normally operable clutch interposed between said shaft and control means whereby to cause the shaft and control means to operate as a unit, means for simultaneously disengaging said clutch and for effecting relative longitudinal movement of the shaft and control means for varying the pitch change of the propeller blades, a blade pitch indicator, a cushioned connection between said control means and indicator, and power means for actuating said drive shaft.

20. Propeller blade pitch changing mechanism of the character described, including a drive shaft, angularly adjustable blades on said shaft, blade control means, a normally operable clutch interposed between said shaft and control means whereby to cause the shaft and control means to operate as a unit, means for simultaneously disengaging said clutch and for effecting relative longitudinal movement of the shaft and control means for varying the pitch change of the propeller blades, a blade pitch indicator, a connection between said control means and indicator, and power means for actuating said drive shaft.

JAMES H. McCOLLOUGH.